United States Patent
Liu et al.

(10) Patent No.: US 11,410,345 B2
(45) Date of Patent: Aug. 9, 2022

(54) METHOD AND ELECTRONIC DEVICE FOR PROCESSING IMAGES

(71) Applicant: BEIJING DAJIA INTERNET INFORMATION TECHNOLOGY CO., LTD., Beijing (CN)

(72) Inventors: Yizhou Liu, Beijing (CN); Zhen Lu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/137,917

(22) Filed: Dec. 30, 2020

(65) Prior Publication Data
US 2021/0304455 A1    Sep. 30, 2021

(30) Foreign Application Priority Data
Mar. 27, 2020   (CN) .......................... 202010231760.9

(51) Int. Cl.
| | |
|---|---|
| G06T 11/00 | (2006.01) |
| G06T 11/60 | (2006.01) |
| G06T 7/90 | (2017.01) |
| H04N 1/60 | (2006.01) |
| H04N 1/56 | (2006.01) |
| G09G 5/02 | (2006.01) |
| G09G 5/06 | (2006.01) |

(52) U.S. Cl.
CPC .............. *G06T 11/001* (2013.01); *G06T 7/90* (2017.01); *G06T 11/60* (2013.01); *G06T 2207/10024* (2013.01); *G06T 2207/20221* (2013.01); *G06T 2207/30196* (2013.01)

(58) Field of Classification Search
CPC combination set(s) only.
See application file for complete search history.

(56) References Cited

U.S. PATENT DOCUMENTS

| | | | |
|---|---|---|---|
| 2017/0206678 A1* | 7/2017 | Kowalczyk | G06K 9/6212 |
| 2018/0075640 A1* | 3/2018 | Meinert | G06N 3/10 |
| 2019/0035163 A1* | 1/2019 | Skwarek | A45D 44/005 |
| 2019/0183769 A1* | 6/2019 | Grosjacques | A61K 8/19 |
| 2019/0295272 A1* | 9/2019 | Aksit | G06T 15/04 |
| 2020/0357178 A1* | 11/2020 | Lin | G06T 11/001 |

* cited by examiner

*Primary Examiner* — Wesner Sajous
(74) *Attorney, Agent, or Firm* — Knobbe, Martens, Olson & Bear, LLP (57) ABSTRACT

A method for processing images may include: acquiring a first mask image based on a portrait image, wherein the first mask image represents a hair area in the portrait image; acquiring a first portrait image including the hair area based on the first mask image and a color lookup table; acquiring a second portrait image including a non-hair area based on the first mask image; and acquiring a target image by interpolating and blending the first portrait image with the second portrait image.

20 Claims, 3 Drawing Sheets

---

Acquiring a first mask image based on a portait image, wherein the first mask image represents a hair area in the portraint image — S201

Receiving a select instruction of a dye color for the hair area, and determining a target dye color based on the select instruction — S202

Acquiring a color lookup table correspinding to the target die color, wherein the color lookup table includes a plurality of color values, wherein colors corresponding to the color values are the same color system as the target dye color but with different grayscale values — S203

Acquiring a colored portrait image retaining the hair area by processing the portrait image based on the first mask image and the color lookup table, and acquiring the portrait image retaining a non-hair area by processing the portrait image based on the first mask image — S204

Acquiring a hair colored image by interpolating and blending the colored portrait image retaining the hair area with the portraint image retaining the non-hair area — S205

METHOD AND ELECTRONIC DEVICE FOR PROCESSING IMAGES

This application is based on and claims priority under 35 U.S.C. 119 to Chinese patent application No. 202010231760.9, filed on Mar. 27, 2020, in the China National Intellectual Property Administration, the disclosure of which is herein incorporated by reference in its entirety.

TECHNICAL FIELD

The present disclosure relates to the field of image processing technologies, and in particular, relates to a method for processing images, an electronic device, and a storage medium.

BACKGROUND

Hairstyle and hair color significantly affect the overall style of a person. Therefore, a virtual hair coloring technology that enables a user to try various colors is gradually becoming popular. With the rapid development of software and hardware on smart terminals, a real-time image processing technology has found increasingly wide application in terminals. Nowadays, an image processing technology can already be used to perform virtual hair coloring. However, in current virtual hair coloring, a dye color needs to be blended with the current color of a user's hair. Therefore, the base color of the user's hair can still be clearly seen. Especially, for some users whose hair has been dyed with dark colors, the effect of virtual hair coloring is inadequate.

SUMMARY

The present disclosure provides a method for processing images, an electronic device, and a storage medium.

According to a first aspect of the present disclosure, a method for processing images is provided. The method includes: acquiring a first mask image based on a portrait image, wherein the first mask image represents a hair area in the portrait image; acquiring a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user; acquiring a second portrait image based on the first mask image, wherein the second portrait image includes a non-hair area in the portrait image; and acquiring a target image by interpolating and blending the first portrait image with the second portrait image.

According to a second aspect of the present disclosure, an electronic device is provided. The electronic device includes: a processor; and a memory configured to store at least one computer program including at least one instruction executable by the processor. The at least one instruction, when executed by the processor, causes the processor to perform a method including: acquiring a first mask image based on a portrait image, wherein the first mask image represents a hair area in the portrait image; acquiring a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user; acquiring a second portrait image based on the first mask image, wherein the second portrait image includes a non-hair area in the portrait image; and acquiring a target image by interpolating and blending the first portrait image with the second portrait image.

According to a third aspect of the present disclosure, a non-transitory storage medium storing at least one computer program including at least one instruction is provided. The at least one instruction, when executed by a processor of an electronic device, causes the electronic device to perform a method including: acquiring a first mask image based on a portrait image, wherein the first mask image represents a hair area in the portrait image; acquiring a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user; acquiring a second portrait image based on the first mask image, wherein the second portrait image includes a non-hair area in the portrait image; and acquiring a target image by interpolating and blending the first portrait image with the second portrait image.

According to a fourth aspect of the present disclosure, a computer program product including a computer program is provided. The computer program, when loaded and run by a processor of an electronic device, causes the electronic device to perform a method including: acquiring a first mask image based on a portrait image, wherein the first mask image represents a hair area in the portrait image; acquiring a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user; acquiring a second portrait image based on the first mask image, wherein the second portrait image includes a non-hair area in the portrait image; and acquiring a target image by interpolating and blending the first portrait image with the second portrait image.

BRIEF DESCRIPTION OF THE DRAWINGS

The accompanying drawings are incorporated in the specification and constitute a part of the specification, show embodiments conforming to the present disclosure, and are used together with the specification to explain the principle of the present disclosure, rather than unduly limiting the present disclosure.

DETAILED DESCRIPTION

For better understanding of the technical solutions according to the present disclosure by persons of ordinary skill in the art, the technical solutions in the embodiments of the present disclosure are clearly and completely described in the following with reference to the accompanying drawings.

It needs to be noted that the terms such as "first" and "second" in the description of the specification, claims, and the foregoing accompanying drawings of the present disclosure are only used to distinguish between similar objects, but are not used to describe a specific order or time sequence. It should be understood that the data thus used are interchangeable in appropriate circumstances and that the embodiments of the present disclosure described herein can be implemented in other sequences than those illustrated or described. The embodiments described below in the embodiments of the present disclosure do not represent all the embodiments consistent with the present disclosure. Instead, the embodiments are only examples of the device and method consistent with some aspects of the present disclosure and as exhaustively described in the appended claims.

User information in the present disclosure is information authorized by a user or fully authorized by all parties.

In some embodiments, the meanings of A and/or B include the following three cases: both A and B, A, and B.

Figure 1:
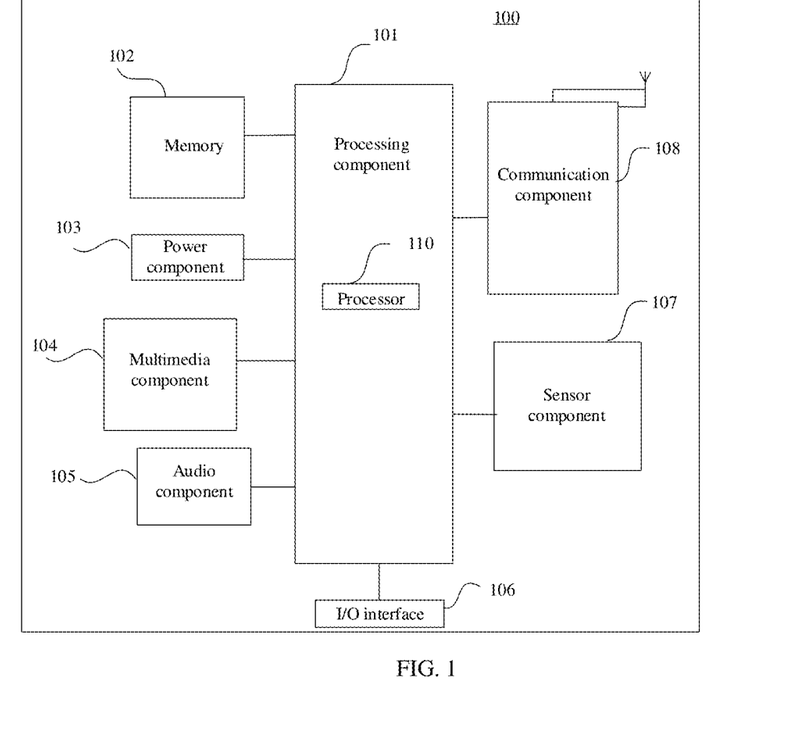
FIG. 1 is an internal structural diagram of a device according to an embodiment of the present disclosure.

A method for processing images according to the present disclosure may be applicable to a device 100 shown in FIG. 1. The device 100 may be a mobile terminal, for example, a mobile phone, a computer, a digital broadcast terminal, a message transceiver device, a game console, a tablet device, medical equipment, fitness equipment, a personal digital assistant, or the like.

Referring to FIG. 1, the device 100 may include one or more of the following components: a processing component 101, a memory 102, a power component 103, a multimedia component 104, an audio component 105, an input/output (I/O) interface 106, a sensor component 107, and a communication component 108. These components are described hereinafter in detail.

The processing component 101 typically controls overall operations of the device 100, such as the operations associated with display, telephone calls, data communications, camera operations, and recording operations. The processing component 101 may include one or more processors 110 to execute instructions to perform the above method. Moreover, the processing component 101 may include one or more modules which facilitate the interaction between the processing component 101 and other components. For instance, the processing component 101 may include a multimedia module to facilitate the interaction between the multimedia component 104 and the processing component 101.

The memory 102 is configured to store various types of data to support the operation of the device 100. Examples of such data include instructions for any applications or methods operated on the device 100, contact data, phonebook data, messages, pictures, video, and the like. The memory 102 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 103 provides power to various components of the device 100. The power component 103 may include a power management system, one or more power sources, and any other components associated with the generation, management, and distribution of power in the device 100.

The multimedia component 104 includes a screen providing an output interface between the device 100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 104 includes a front camera and/or a rear camera. The front camera and the rear camera may receive external multimedia data while the device 100 is in an operation mode, such as a photographing mode or a video mode. Each of the front camera and the rear camera may be a fixed optical lens system or have focus and optical zoom capability.

The audio component 105 is configured to output and/or input audio signals. For example, the audio component 105 includes a microphone ("MIC") configured to receive an external audio signal when the device 100 is in an operation mode, such as a call mode, a recording mode, and a voice recognition mode. The received audio signal may be further stored in the memory 102 or transmitted via the communication component 108. In some embodiments, the audio component 105 further includes a speaker to output audio signals.

The I/O interface 106 provides an interface between the processing component 101 and peripheral interface modules, such as a keyboard, a click wheel, buttons, and the like. The buttons may include, but are not limited to, a home button, a volume button, a starting button, and a locking button.

The sensor component 107 includes one or more sensors to provide status assessments of various aspects of the device 100. For instance, the sensor component 107 may detect an open/closed state of the device 100, relative positioning of components, e.g., the display and the keypad, of the device 100, a change in position of the device 100 or a component of the device 100, a presence or absence of user contact with the device 100, an orientation or an acceleration/deceleration of the device 100, and a change in temperature of the device 100. The sensor component 107 may include a proximity sensor configured to detect the presence of nearby objects without any physical contact. The sensor component 107 may also include a light sensor, such as a CMOS or CCD image sensor, for use in imaging applications. In some embodiments, the sensor component 107 may also include an accelerometer sensor, a gyroscope sensor, a magnetic sensor, a pressure sensor, or a temperature sensor.

The communication component 108 is configured to facilitate communication, wired or wirelessly, between the device 100 and other devices. The device 100 can access a wireless network based on a communication standard, such as Wi-Fi, carrier networks (for example, 2G, 3G, 4G, or 5G), or a combination thereof. In some embodiments, the communication component 108 receives a broadcast signal or broadcast associated information from an external broadcast management system via a broadcast channel In some embodiments, the communication component 108 further includes a near-field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for processing images.

Figure 2:
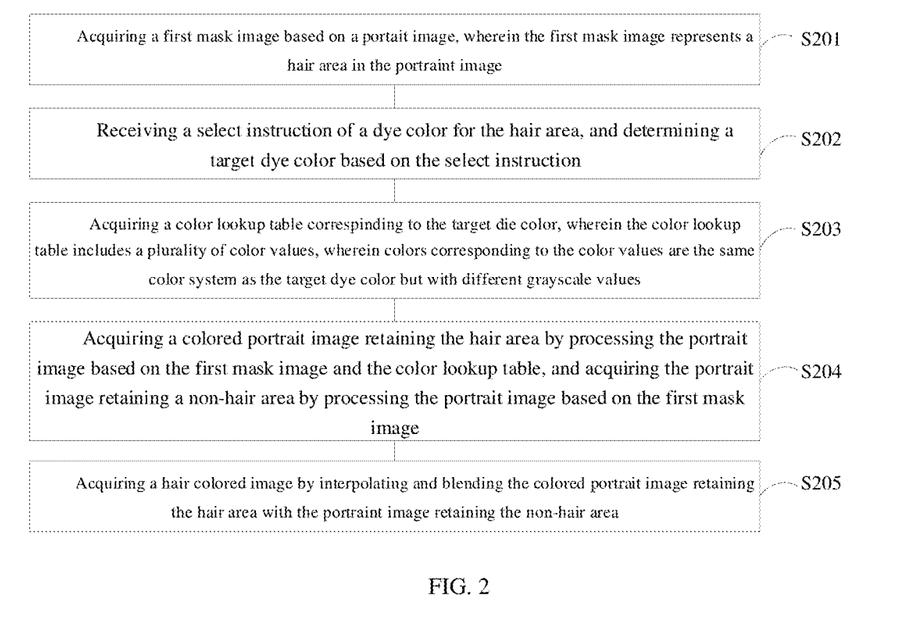
FIG. 2 is a flowchart of a method for processing images according to an embodiment of the present disclosure.

FIG. 2 is a flowchart of a method for processing images according to an embodiment of the present disclosure. The method for processing images disclosed in this embodiment of the present disclosure is applicable to the device 100 shown in FIG. 1. As shown in FIG. 2, the method includes the following contents.

In S201, a first mask image is acquired based on a portrait image, wherein the first mask image represents a hair area in the portrait image.

The portrait image is a target portrait image for image processing.

In some embodiments, the portrait image is acquired in a photographing process, and various special effects are added to the target portrait image. For example, on a social networking platform (e.g., a short video platform), a user may acquire the target portrait image by virtue of a photographing function on the platform, and then implements virtual hair coloring on the hair area by using hair coloring special effects added to the photographing function.

In a virtual hair coloring process, a static human figure image on a mobile terminal or a portrait image photographed in real time is semantically segmented, such that a mask image of the hair area may be extracted. The mask image is a binary image formed by 0 and 1, and the target portrait image may be blocked (completely or partially) based on the mask image, to control a processing area or processing process of the image.

In some embodiments, during the processing of the portrait image, the target portrait image may be inputted into a neural network model, and the first mask image is then outputted based on the neural network model. The first mask image represents the hair area in the portrait image. The neural network model may be another model such as a convolutional neural network (CNN) model, which is not limited in this embodiment.

Based on the first mask image, the outline of the hair area may be acquired from the portrait image. In the first mask image, it needs to be ensured that the overall outline of the hair area is relatively clear. In this way, the hair area with a clear outline can be acquired from the portrait image based on the first mask image.

Figure 3:
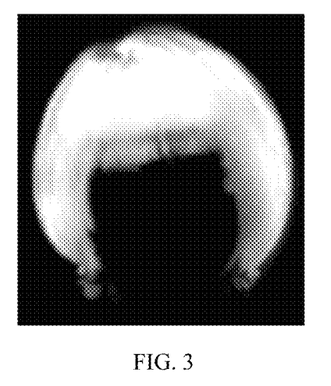
FIG. 3 is a schematic diagram of a mask image according to an embodiment of the present disclosure.
Figure 4:
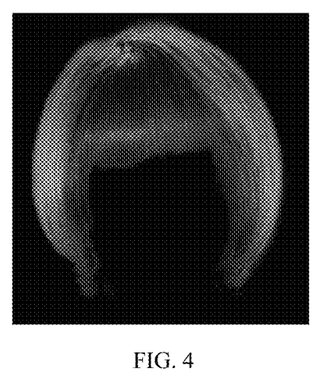
FIG. 4 is a schematic diagram of a hair area extracted based on a mask image according to an embodiment of the present disclosure.

FIG. 3 shows the mask image of the hair area in the portrait image. FIG. 4 is the hair area in the portrait image acquired based on the mask image in FIG. 3. Because an outline of the mask image in FIG. 3 is very clear, an outline of the hair area in the portrait image acquired based on the mask image in FIG. 3 also very clear.

In S202, a select instruction of a dye color for the hair area is received, and a target dye color is determined based on the select instruction.

In some embodiments, during the processing of the portrait image, for example, during the use of the hair coloring special effects, an electronic device may display a plurality of dye colors such as pink, yellow, green, and blue on a screen for selection by a user. The user may select a dye color from a plurality of dye colors according to the user's requirement by using a selection operation such as a click on the screen or a press on the screen. The electronic device receives the corresponding select instruction in the background, and determines, based on the select instruction, the target dye color selected by the user. For example, the user may select pink as the target dye color.

In S203, a color lookup table corresponding to the target dye color is acquired, wherein the color lookup table includes a plurality of color values, colors corresponding to the color values being the same color system as a target dye color but with different grayscale values.

In some embodiments, the color value is an RGB value. For example, the color value may be RGB (240, 196, 219). It needs to be noted that in addition to the processing of a portrait image in RGB mode, this embodiment is also applicable to the processing of a portrait image in another color mode, for example, a portrait image in CMYK mode, and it is only necessary to convert the portrait image in CMYK mode into the portrait image in RGB mode.

In some embodiments, the color lookup table may also be referred to as a display lookup table (LUT). The color lookup table in this embodiment is a 3D LUT, and a color value may be converted into another corresponding color value, such that useful information on the image can be highlighted, the optical contrast of the image can be enhanced, and the like.

In some embodiments, each dye color corresponds to one color lookup table. The color lookup table of each dye color includes a plurality of color values, colors corresponding to the color values being the same color system as a target dye color but with different grayscale values (brightness values). For example, when the dye color is pink, pink has a plurality of color values such as light pink and dark pink that belong to the pink system. In addition, these color values in the pink system correspond to different grayscale values. Therefore, even if color values belong to the same color system, the color values may have brightness differences. After determining the target dye color, the electronic device may acquire the color lookup table corresponding to the target dye color.

In S204, a colored portrait image retaining the hair area is acquired by processing the portrait image based on the first mask image and the color lookup table, and the portrait image retaining a non-hair area is acquired by processing the portrait image based on the first mask image.

In some embodiments, for ease of description, the colored portrait image retaining the hair area is a first portrait image, and the portrait image retaining the non-hair area is a second portrait image. The electronic device may acquire, by rendering the portrait image based on the first mask image and the color lookup table corresponding to the target dye color, the colored portrait image that is colored based on the target dye color and retains the hair area. During the rendering of the portrait image, a third portrait image may be first acquired by extracting the hair area in the portrait image based on the first mask image, and then the hair area in the portrait image, that is, the third portrait image, is colored. Alternatively, a fourth portrait image is acquired by directly coloring the complete area of the portrait image, and then the hair area in the fourth portrait image is extracted based on the first mask image, provided that the colored portrait image retaining the hair area can be eventually acquired, which is not limited in this embodiment.

In some embodiments, the portrait image retaining the non-hair area, that is, the second portrait image, is acquired by blocking the hair area in the portrait image based on the first mask image.

In S205, a hair colored image is acquired by interpolating and blending the colored portrait image retaining the hair area with the portrait image retaining the non-hair area.

In some embodiments, the colored portrait image retaining the hair area and the portrait image retaining the non-hair area are interpolated and blended, that is, the first portrait image and the second portrait image are interpolated and blended, such that the hair colored image can be acquired. The hair colored image is a target image of image processing. Only the hair area is dyed with the target dye color in the hair colored image, to implement virtual hair coloring of the hair area of the user.

In some embodiment, in S205, the images may be interpolated and blended by using the following formula:

$$G_{result}=(G_{base}*\text{mask})+((1.0-\text{mask})*G_{lut}),$$

wherein $G_{result}$ is a pixel matrix corresponding to the hair colored image, $G_{base}$ is a pixel matrix corresponding to the target portrait image, mask is a pixel matrix corresponding to the first mask image, $G_{lut}$ is a pixel matrix corresponding to the colored portrait image, $(G_{base}*\text{mask})$ is a pixel matrix corresponding to the target portrait image retaining the non-hair area based on the first mask image, and $((1.0-\text{mask})*G_{lut})$ is a pixel matrix corresponding to the colored portrait image retaining the hair area based on the first mask image.

In the foregoing method for processing images, the first mask image of the hair area in the portrait image is first acquired. Next, after the target dye color for the hair area in the portrait image is determined, the color lookup table corresponding to the target dye color is acquired. The colored portrait image retaining the hair area is acquired by rendering the portrait image based on the color values in the color lookup table and the first mask image. The portrait image retaining the non-hair area is acquired by blocking the hair area in the portrait image based on the first mask image. Subsequently, the portrait image retaining the non-hair area is interpolated and blended with the colored portrait image retaining the hair area, and the hair colored image is acquired. In addition, the color values in the color lookup table have different grayscale values. Therefore, the color in the rendered image is not completely uniform but has particular brightness differences.

In some embodiments, in S201, the first mask image of the hair area in the target portrait image may be acquired by:

acquiring an initial mask image of the hair area in the target portrait image;

acquiring a first color value of each pixel in the initial mask image; and calculating a target color value based on the first color value of each pixel in the initial mask image, and acquiring the first mask image by replacing the first color value of each pixel in the initial mask image with the target color value.

The initial mask image may be represented as a third mask image. The target color value may be determined by acquiring the third mask image based on the portrait image, wherein the third mask image represents the hair area in the portrait image; and calculating the target color value based on the color value of each pixel in the third mask image.

In the photographing process of the portrait image, for various reasons, for example, the shaking of a mobile phone, a noise area may exist in the hair area in the portrait image. To achieve a better hair coloring effect, when the initial mask image of the hair area in the portrait image is acquired, the corresponding target color value may be calculated based on the first color value of each pixel in the initial mask image, and the first mask image with the noise area eliminated is acquired by replacing the first color value of each pixel in the initial mask image with the target color value.

In some embodiments, the calculating a target color value based on the first color value of each pixel in the initial mask image, and acquiring the first mask image by replacing the first color value of each pixel in the initial mask image with the target color value may include:

acquiring a preset convolution kernel operator;

calculating a target first color value based on the first color value of each pixel in the initial mask image and the convolution kernel operator; and acquiring the first mask image by replacing the first color value of each pixel in the initial mask image with the target first color value.

In some embodiments, the initial mask image may be represented as the third mask image. The target color value may be determined by:

acquiring a convolution kernel operator, wherein the convolution kernel operator is configured to perform weighted averaging on pixel values in a particular area in the third mask image; and determining the target color value based on the color value of each pixel in the third mask image and the convolution kernel operator. A size of the convolution kernel operator is A×A, that is, the convolution kernel operator is configured to perform weighted averaging on the pixel values in the A×A pixel region in the third mask image, where A represents the number of pixels and is a positive integer.

When a mobile terminal such as a mobile phone renders the portrait image in real time, the acquired initial mask image of the hair area is usually prone to inaccurate recognition and a relatively light color at an edge, which are caused by a hardware on the mobile terminal.

In practice, images may be blurred in a plurality of ways. In one way, the initial mask image may be blurred by using the following convolution formula:

$$G_{(i,j)} = \sum_{k,l} \int (i+k, j+1)*h\,(k, l),$$

wherein $G_{(i,\,j)}$ is the target first color value, h is the convolution kernel operator, and K and I are vertical and horizontal values of each pixel in the initial mask image. The foregoing convolution formula is applied, a first color component value of each pixel in the initial mask image is multiplied by the convolution kernel operator one by one and a sum of the products is calculated. The obtained result is the target first color value. The first mask image with the noise area eliminated is acquired by replacing the first color value of corresponding pixel in the initial mask image with the target first color value.

In some embodiments, in S201, calculating the target color value based on the first color value of each pixel in the initial mask image, and acquiring the first mask image by replacing the first color value of each pixel in the initial mask image with the target color value may include:

acquiring a second mask image, wherein the second mask image represents a hair area in a previous image of the portrait image;

acquiring an image weight value of the second mask image;

acquiring a second color value of each pixel in the second mask image;

calculating a target second color value based on the image weight value, the first color value, and the second color value; and acquiring the first mask image by replacing the second color value of each pixel in the initial mask image with the target first color value.

The target second color value may be represented as the target color value. In some embodiments, the target color value may also be acquired by acquiring a second mask image, wherein the second mask image represents a hair area in a previous image of the portrait image; acquiring an image weight value of the second mask image; and determining the target color value based on the image weight value, the color value of each pixel in the third mask image, and a color value of each pixel in the second mask image.

When the mobile terminal such as a mobile phone renders the portrait image in real time, if a user slightly shakes the head, the initial mask image of the hair area jitters to different degrees, severely affecting an eventual hair coloring effect. Therefore, in this embodiment, the second mask image of the hair area in the previous frame of portrait image of the portrait image is acquired, and the first mask image with the jitter (that is, the noise area) eliminated is acquired by smoothing the initial mask image based on the second mask image, such that the impact of the noise area can be reduced in subsequent rendering.

In practice, images may be smoothed in a plurality of ways. The initial mask image may be smoothed by using the following formula:

$$G_{result}=(\overline{\omega}*G_{pre})+(1-\overline{\omega})*G_{cur},$$

wherein $\overline{\omega}$ is the image weight value of the second mask image, $G_{pre}$ is a pixel matrix corresponding to the second mask image, and $G_{cur}$ a pixel matrix corresponding to is the initial mask image.

At the mobile terminal, the semantic segmentation of the hair area is usually not very accurate. As a result, particular noise areas are generated. In this embodiment, the initial mask image is blurred and smoothed, to remove these noise areas.

It needs to be noted that, the mask image of the hair area may be blurred and smoothed in a way other than the above ways, which is not limited in this embodiment. For example, a noise area with jitters and flickers may be filtered from the mask image by high-pass filtering.

In some embodiments, in S204, acquiring the colored portrait image retaining the hair area by processing the portrait image based on the first mask image and the color lookup table may include:

extracting, from the portrait image based on the first mask image, the portrait image retaining the hair area; and acquiring the colored portrait image by rendering the portrait image based on the color lookup table, wherein the portrait image includes the portrait image retaining the hair area;

or, acquiring the colored portrait image by rendering the portrait image based on the color lookup table; and extracting, from the colored portrait image based on the first mask image, the colored portrait image retaining the hair area.

In some embodiments, the portrait image may be first rendered and the hair area is then extracted, or the hair area may be first extracted from the portrait image and the hair area is then rendered. No matter which process is performed first, the portrait image retaining the hair area may be acquired.

In some embodiments, after the first mask image of the hair area in the portrait image is acquired, the portrait image retaining the hair area is first extracted from the portrait image based on the first mask image, the portrait image retaining the hair area is then rendered based on the color lookup table, and hence the colored portrait image retaining the hair area is acquired. Alternatively, after the first mask image of the hair area in the portrait image is acquired, the colored portrait image is acquired by rendering the portrait image based on the color lookup table, and then the colored portrait image retaining the hair area is extracted from the colored portrait image based on the first mask image.

In some embodiments, when the hair area is first extracted from the portrait image and the hair area is then rendered, for ease of description, the extracted portrait image including the hair area is referred to as a third portrait image. Acquiring the first portrait image by processing the portrait image based on the first mask image and the color lookup table may include:

extracting a third portrait image from the portrait image based on the first mask image, wherein the third portrait image includes the hair area in the portrait image; and acquiring the first portrait image by rendering the third portrait image based on the color lookup table.

In some embodiments, when the portrait image is first rendered and the hair area is then extracted, for ease of description, the colored portrait image acquired by rendering the portrait image is referred to as a fourth portrait image. Acquiring the first portrait image by processing the portrait image based on the first mask image and the color lookup table may include:

acquiring a fourth portrait image by rendering the portrait image based on the color lookup table, wherein the color of the fourth portrait image is a target color; and extracting the first portrait image from the fourth portrait image based on the first mask image.

In some embodiments, the method further includes: generating a corresponding color lookup table for each dye color.

In some embodiments, the corresponding color lookup table is correspondingly generated for each dye color. The color lookup table of each dye color includes a plurality of color values, colors corresponding to the color values being the same color system as a target dye color but with different grayscale values (brightness values). For example, it is assumed that the dye color is pink, pink has a plurality of color values such as light pink and dark pink that belong to the pink system, and these color values that belong to the pink system have different corresponding grayscale values. Therefore, color values that belong to the same color system also have brightness differences.

In some embodiments, generating the corresponding color lookup table for each dye color may include:

acquiring a standard lookup table, wherein a color value with designated coordinates in the standard lookup table includes a representative color value chosen in advance;

calculating a first grayscale value based on the representative color value;

acquiring a plurality of color values corresponding to each dye color, wherein colors corresponding to the color values are the same color system as a target dye color but with different grayscale values;

calculating a second grayscale value based on the color value of the dye color; and determining the matched first grayscale value based on the second grayscale value, and acquiring the color lookup table of each dye color by replacing the representative color value of designated coordinates corresponding to the first grayscale value with a color value corresponding to the second grayscale value as a key color value.

That is, the standard lookup table includes a plurality of representative color values, for each dye color, representative color values can be respectively replaced with color values with the same grayscale value, and hence a color lookup table of each dye color is acquired. The color lookup table of the target dye color is generated based on the standard lookup table and the target dye color by replacing a first grayscale value of a color value in the color lookup table with a second grayscale value of a color value corresponding to the target dye color, wherein the first grayscale value and the second grayscale value match each other. Correspondingly, the steps of generating the color lookup table of the target dye color are as follows:

acquiring first grayscale values of a plurality of representative color values included in a standard lookup table;

acquiring second grayscale values of a plurality of color values corresponding to the target dye color, wherein colors corresponding to the color values are the same color system as a target dye color but with different grayscale values; and determining a first grayscale value matching each second grayscale value, and acquiring the color lookup table of the target dye color by replacing the representative color value corresponding to the first grayscale value with a color value corresponding to each second grayscale value as a key color value.

In some embodiments, the color lookup table may be generated by grayscale value matching.

For generation of the color lookup table in this embodiment, the color lookup table of dye color values may be generated based on the standard lookup table. All designated coordinates in the standard lookup table are mapped into color values in the same color system.

In some embodiments, for generation of a color lookup table corresponding to each dye color, the standard lookup table is first acquired. A color value with designated coordinates in the standard image is a representative color value chosen in advance. A related developer may choose the representative color value according to an actual requirement, and then calculate a first grayscale value of a representative color value at each group of designated coordinates. For each dye color, a plurality of color values corresponding to the dye color are separately acquired. For example, for pink, a plurality of color component values that all belong to the pink system may be acquired, and second grayscale values of a plurality of color values of each dye color are then calculated. The second grayscale value is compared with the first grayscale value to determine the first grayscale value matching the second grayscale value (for example, if both the second grayscale value and the first grayscale value are 125, it may be considered that the second grayscale value matches the first grayscale value). The color value of the second grayscale value is then filled as the key color value at designated coordinates corresponding to the first grayscale value, and hence a color lookup table of a dye color is generated.

A color lookup table of each dye color may be rapidly generated by grayscale value matching. In practice, the related developer may further adjust color values in the color lookup table according to an actual requirement.

In some embodiments, acquiring the colored portrait image by rendering the portrait image based on the color lookup table includes:

acquiring a key color value corresponding to each pixel in the portrait image by searching the color lookup table; and acquiring the colored portrait image by rendering each pixel in the portrait image based on the key color value, wherein the colored portrait image includes the fourth portrait image.

In some embodiments, the color value of each pixel in the portrait image may be acquired, and a key color component value is then acquired from the color lookup table based on the color value. The key color component value may then be rendered at the corresponding pixel in the portrait image, and the colored portrait image rendered with the target dye color is acquired.

It needs to be noted that, in some embodiments, instead of being blended with the original base color of hair, a key color component value in the color lookup table is directly rendered on each pixel in the portrait image to perform coloring directly. Therefore, the base color of the user's hair may be ignored. In this way, regardless of a dye color value selected by the user, the dye color value is completely mapped into the user's hair area.

In some embodiments, the color lookup table uses an R color component, a G color component, and a B color component as index coordinates axes, and acquiring the key color value corresponding to each pixel in the portrait image by searching the color lookup table includes:

acquiring a color value of each pixel in the portrait image, wherein the color value includes an R color component value, a G color component value, and a B color component value;

determining target coordinates in the color lookup table based on the R color component value, the G color component value, and the B color component value;

in the case that the target coordinates are the designated coordinates, acquiring a key color value corresponding to the designated coordinates; and in the case that the target coordinates are not the designated coordinates, acquiring a key color value corresponding to designated coordinates closest to the target coordinates.

In practice, it may be considered that the color lookup table records three-dimensional coordinates of key color values. During a search, a corresponding key color component value may be found based on the color value of each pixel. For example, a plane corresponding to G and R color components may first be found based on a B color component value, and a corresponding key color value is then found in this plane based on an R color component value and a G color component value.

The color lookup table stores the key color value at designated coordinates. Therefore, the target coordinates are determined in three-dimensional coordinates based on an R color component value, a G color component value, and a B color component value of a color value of each pixel. In the case that the target coordinates are not designated coordinates, a key color value at designated coordinates closest to the target coordinates may be acquired. In the case that the target coordinates are designated coordinates, the key color value at the designated coordinates is directly acquired. In other words, during acquisition of a key color value corresponding to each pixel in the portrait image, a key color value corresponding to color coordinates the same as the target coordinates is acquired from a color lookup table corresponding to the target color; and alternatively, color coordinates closest to the target coordinates are acquired in the case that the color lookup table do not include the target coordinates, and a key color value corresponding to the color coordinates is determined. The color coordinates are designated coordinates of the key color value.

In some embodiments, in S205, acquiring the colored portrait image by rendering the pixel in the portrait image based on the key color value includes:

in the case that the acquired key color value is a key color value corresponding to the designated coordinates, acquiring the colored portrait image by replacing the color value of each pixel in the portrait image with the key color value; and in the case that the acquired key color value is a key color value corresponding to designated coordinates closest to the target coordinates, acquiring the colored portrait image by interpolating and blending the key color value with the color value of each pixel in the portrait image.

In some embodiments, in the case that the acquired key color value is a key color value corresponding to designated coordinates, the color value of a corresponding pixel in the portrait image is directly replaced with the key color value; and in the case that the acquired key color value is a key color value corresponding to designated coordinates closest to the target coordinates, interpolation and blending need to be performed using these key color values. After all pixels are processed, the colored portrait image may be acquired.

For ease of understanding of this embodiment by a person skilled in the art, this embodiment is described below with reference to specific examples.

Figure 5:
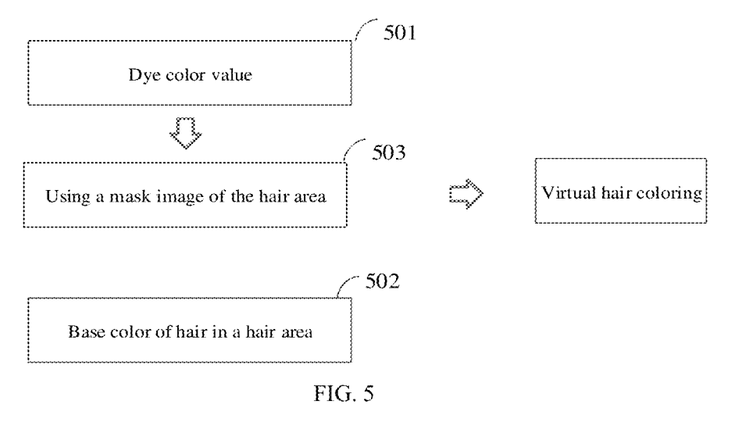
FIG. 5 is a schematic topology diagram of current virtual hair coloring according to an embodiment of the present disclosure.

FIG. 5 is a schematic topology diagram of current virtual hair coloring according to an embodiment of the present disclosure. As shown in FIG. 5, the virtual hair coloring includes: 501, acquiring a dye color value of a hair area; 502, acquiring a base color of hair in the hair area; and 503, blending the dye color value with the base color of the hair in the hair area in a portrait image by using a mask image of the hair area in the portrait image.

It is easy to understand that the virtual hair coloring is susceptible to the base color of a user's hair. For a dye color value, the dye color value may be converted into dye color values in different color models as required, for example, RGB, HSV, and LAB. Regardless of the differences, in this virtual hair coloring technology, no matter how a dye color value is blended with the base color of hair, the base color of hair in the hair area is displayed, resulting in an unreal and unnatural coloring effect.

Specifically, it is assumed that the dye color value and the base color of the users hair are blended, and a dye portrait image may be acquired by color blending by using the following formula:

$$C_{result}=1.0-(1.0-C_{base})*(1.0-C_{overlay}),$$

wherein $C_{result}$ is a pixel matrix corresponding to a dye coloring portrait image after the color blending, $C_{base}$ is a dye color value, and $C_{overlay}$ is a pixel matrix corresponding to the portrait image*mask, and the mask is a pixel matrix corresponding to a mask image of the portrait image.

During the color blending of the dye color value and the base color of the users hair, because users have different base colors of hair, hair coloring effects of color blending are usually different. It can be seen that although the same dye color value is used, effects vary for different people, and eventual effects are different.

Figure 6:
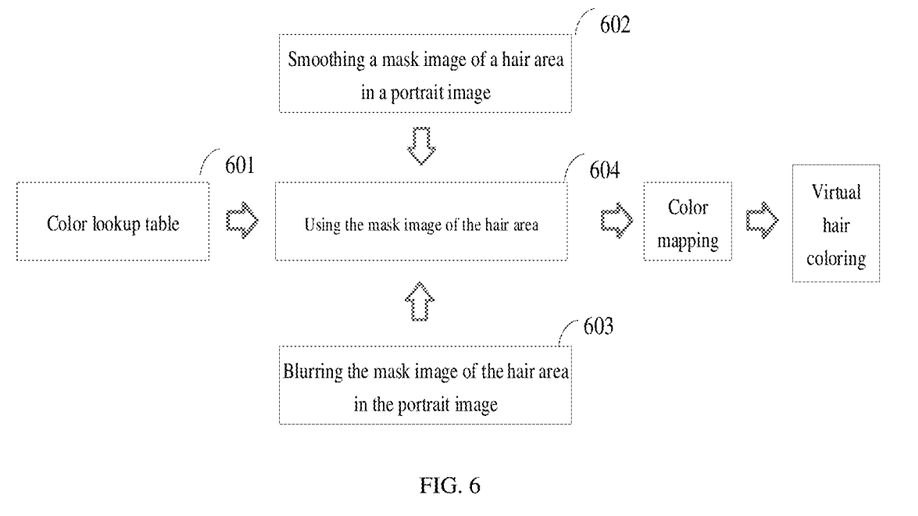
FIG. 6 is a schematic topology diagram of virtual hair coloring according to an embodiment of the present disclosure.

FIG. 6 is a schematic topology diagram of virtual hair coloring in this embodiment. The virtual hair coloring mainly includes: 601, acquiring a color lookup table corresponding to a dye color value; 602, smoothing a mask image of a hair area in a portrait image; 603, blurring the mask image of the hair area in the portrait image; and 604, extracting the hair area in the portrait image by using the mask image of the hair area, and then mapping a corresponding color component value in the color lookup table into pixels in the hair area in the portrait image.

In some embodiments, based on a color value of each pixel in the hair area, a corresponding key color component value is found from the color lookup table and rendered to a corresponding pixel. Therefore, the problem that the base color of the users hair is unfriendly during the virtual hair coloring of the user can be resolved.

It should be understood that although the various steps in the flowchart of the FIG. 2 are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in FIG. 2 may include a plurality of steps or stages, which are not necessarily performed at the same time, but may be executed at different time. The execution order thereof is also not necessarily performed sequentially, but may be performed alternately or alternately with at least a portion of other steps or steps or stages of other steps.

Figure 7:
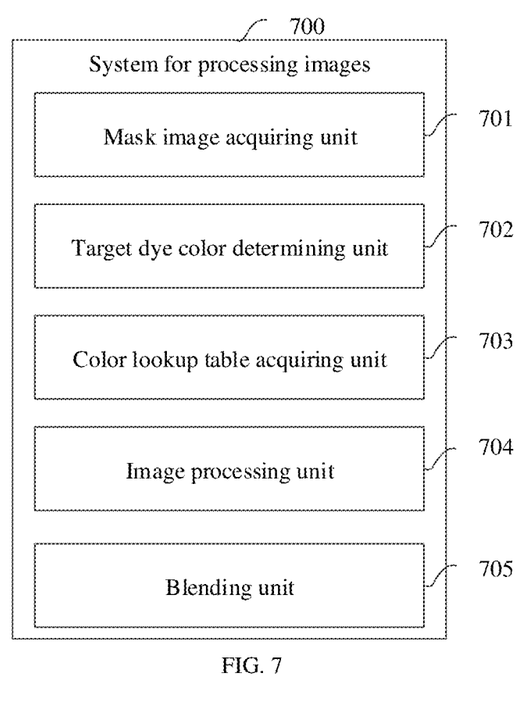
FIG. 7 is a block diagram of a system for processing images according to an embodiment of the present disclosure.

FIG. 7 shows a system for processing images 700 according to an example embodiment. Referring to FIG. 7, the system includes a processor, and the processor is configured to implement the functions of a mask image acquiring unit 701, a target dye color determining unit 702, a color lookup table acquiring unit 703, an image processing unit 704, and a blending unit 705.

The mask image acquiring unit 701 is configured to acquire a first mask image based on a portrait image, wherein the first mask image represents a hair area in the portrait image.

The image processing unit 704 is configured to acquire a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user; and acquire a second portrait image based on the first mask image, wherein the second portrait image includes a non-hair area in the portrait image. In some embodiments, the target dye color determining unit 702 is configured to receive a select instruction of a dye color for the hair area, and determine a target dye color based on the select instruction; the color lookup table acquiring unit 703 is configured to acquire a color lookup table corresponding to the target dye color.

The blending unit 705 is configured to acquire a target image by interpolating and blending the first portrait image with the second portrait image.

In some embodiments, the mask image acquiring unit 701 is configured to acquire a third mask image based on the portrait image, wherein the third mask image represents the hair area in the portrait image; calculate a target color value based on the color value of each pixel in the third mask image; and acquire the first mask image by replacing the color value of each pixel in the third mask image with the target color value.

In some embodiments, the mask image acquiring unit 701 is configured to acquire a convolution kernel operator, wherein the convolution kernel operator is configured to perform weighted averaging on pixel values in a particular area in the third mask image; and determine the target color value based on the color value of each pixel in the third mask image and the convolution kernel operator.

In some embodiments, the mask image acquiring unit 701 is configured to acquire a second mask image, wherein the second mask image represents a hair area in a previous image of the portrait image; acquire an image weight value of the second mask image; and determine the target color value based on the image weight value, the color value of each pixel in the third mask image, and a color value of each pixel in the second mask image.

In some embodiments, the color lookup table is generated based on a standard lookup table and the target dye color by replacing a first grayscale value of a color value in the color lookup table with a second grayscale value of a color value corresponding to the target dye color, wherein the first grayscale value and the second grayscale value match each other.

In some embodiments, the image processing unit 704 is configured to extract a third portrait image from the portrait image based on the first mask image, wherein the third portrait image includes the hair area in the portrait image; and acquire the first portrait image by rendering the third portrait image based on the color lookup table.

In some embodiments, the image processing unit 704 is configured to acquire a fourth portrait image by rendering the portrait image based on the color lookup table; and extract the first portrait image from the fourth portrait image based on the first mask image.

In some embodiments, the color lookup table includes a plurality of key color values; and the image processing unit 704 is configured to acquire a key color value corresponding to each pixel in the portrait image by searching the color lookup table; and acquire the fourth portrait image by rendering each pixel in the portrait image based on the key color value.

In some embodiments, the color lookup table uses an R color component, a G color component, and a B color component as coordinates axes, and the image processing unit 704 is configured to acquire a color value of each pixel in the portrait image, wherein the color value includes an R color component value, a G color component value, and a B color component value; determine target coordinates in the color lookup table based on the R color component value, the G color component value, and the B color component value; and acquire a key color value corresponding to color coordinates the same as the target coordinates from the color lookup table.

In some embodiments, the image processing unit 704 is configured to acquire color coordinates closest to the target coordinates in the case that the color lookup table do not include the target coordinates; and determine a key color value corresponding to the color coordinates.

In some embodiments, the image processing unit 704 is configured to acquire the fourth portrait image by interpolating and blending the key color value with a color value of each pixel in the portrait image.

Regarding the system in the above embodiments, the operations of the respective units have been described in detail in the method embodiments, which are not described herein any further.

In some embodiments, an electronic device is further provided. A schematic structural diagram of the electronic device may be shown in FIG. 1. The electronic device includes: a processor; and a memory configured to store at least one computer program including at least one instruction executable by the processor. The at least one computer program, when loaded and run by the processor, causes the processor to execute instructions for implementing the method for processing images described in the foregoing embodiments.

For example, a non-transitory computer-readable storage medium may be a ROM, a random-access memory (RAM), a CD-ROM, a magnetic tape, a floppy disk, an optical data storage device, or the like.

In some embodiments, a computer program product including at least one computer program is provided, wherein the at least one computer program is stored in a computer-readable storage medium. The at least one computer program, when loaded and run by a processor of a device, causes the device to execute instructions for:

acquiring a first mask image based on a portrait image, wherein the first mask image represents a hair area in the portrait image;

acquiring a first portrait image based on the first mask image and a color lookup table, wherein the color lookup table includes a plurality of color values, colors corresponding to the color values being the same color system as a target dye color but with different grayscale values, the first portrait image includes the hair area with the target dye color, and the target dye color is selected by a terminal user;

acquiring a second portrait image based on the first mask image, wherein the second portrait image includes a non-hair area in the portrait image; and acquiring a target image by interpolating and blending the first portrait image with the second portrait image.

Other embodiments of the present disclosure may be easily conceived by those skilled in the art after taking the description into consideration and practicing the solution disclosed herein. The present disclosure is intended to cover any variations, uses, or adaptive changes of the present disclosure. These variations, uses, or adaptive changes follow the general principles of the present disclosure and include common general knowledge or conventional technical means in the art that are not disclosed herein. The description and the embodiments are to be regarded only as being examples. The true scope and spirit of the present disclosure are subject to the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing images executed by an electronic device, the method comprising:

acquiring a first mask image based on a portrait image, wherein the first mask image represents a hair area in the portrait image;

acquiring a first portrait image based on the first mask image and a color lookup table, wherein the color lookup table comprises a plurality of color values, colors corresponding to the color values are of the same color system as a target dye color but with different grayscale values, the first portrait image comprises the hair area with the target dye color, and the target dye color is selected by a terminal user;

acquiring a second portrait image based on the first mask image, wherein the second portrait image comprises a non-hair area in the portrait image; and acquiring a target image by interpolating and blending the first portrait image with the second portrait image.

2. The method according to claim 1, wherein said acquiring the first mask image based on the portrait image comprises:

acquiring a second mask image based on the portrait image, wherein the second mask image represents the hair area in the portrait image;

calculating a target color value based on a color value of each pixel in the second mask image; and acquiring the first mask image by replacing the color value of each pixel in the second mask image with the target color value.

3. The method according to claim 2, wherein said calculating the target color value based on the color value of each pixel in the second mask image comprises:

acquiring a convolution kernel operator, wherein the convolution kernel operator is configured to perform weighted averaging on pixel values in a particular area in the second mask image; and determining the target color value based on the color value of each pixel in the second mask image and the convolution kernel operator.

4. The method according to claim 2, wherein said calculating the target color value based on the color value of each pixel in the second mask image comprises:

acquiring a third mask image, wherein the third mask image represents a hair area in a previous image of the portrait image;

acquiring an image weight value of the third mask image; and determining the target color value based on the image weight value, the color value of each pixel in the second mask image, and a color value of each pixel in the third mask image.

5. The method according to claim 1, wherein the color lookup table is generated based on a standard lookup table and the target dye color by replacing a first grayscale value of a color value in the color lookup table with a second grayscale value of a color value corresponding to the target dye color, wherein the first grayscale value and the second grayscale value match each other.

6. The method according to claim 1, wherein said acquiring the first portrait image based on the first mask image and the color lookup table comprises:

extracting a third portrait image from the portrait image based on the first mask image, wherein the third portrait image comprises the hair area in the portrait image; and acquiring the first portrait image by rendering the third portrait image based on the color lookup table.

7. The method according to claim 1, wherein said acquiring the first portrait image based on the first mask image and the color lookup table comprises:

acquiring a fourth portrait image by rendering the portrait image based on the color lookup table; and extracting the first portrait image from the fourth portrait image based on the first mask image.

8. The method according to claim 7, wherein the color lookup table comprises a plurality of key color values, and said acquiring the fourth portrait image by rendering the portrait image based on the color lookup table comprises:

acquiring a key color value corresponding to each pixel in the portrait image by searching the color lookup table; and acquiring the fourth portrait image by rendering each pixel in the portrait image based on the key color value.

9. The method according to claim 8, wherein the color lookup table uses an R color component, a G color component, and a B color component as coordinates axes, and said acquiring the key color value corresponding to each pixel in the portrait image by searching the color lookup table comprises:

acquiring a color value of each pixel in the portrait image, wherein the color value comprises an R color component value, a G color component value, and a B color component value;

determining target coordinates in the color lookup table based on the R color component value, the G color component value, and the B color component value;

acquiring a key color value corresponding to the target coordinates from the color lookup table.

10. The method according to claim 8, further comprising:

acquiring color coordinates closest to the target coordinates in the case that the color lookup table do not comprise the target coordinates;

determining a key color value corresponding to the color coordinates.

11. The method according to claim 10, wherein said acquiring the fourth portrait image by rendering each pixel in the portrait image based on the key color value comprises:

acquiring the fourth portrait image by interpolating and blending the key color value with a color value of each pixel in the portrait image.

12. An electronic device, comprising:

a processor; and a memory configured to store at least one computer program comprising at least one instruction executable by the processor;

wherein the at least one instruction, when executed by the processor, causes the processor to perform a method comprising:

acquiring a first mask image based on a portrait image, wherein the first mask image represents a hair area in the portrait image;

acquiring a first portrait image based on the first mask image and a color lookup table, wherein the color lookup table comprises a plurality of color values, colors corresponding to the color values are of the same color system as a target dye color but with different grayscale values, the first portrait image comprises the hair area with the target dye color, and the target dye color is selected by a terminal user;

acquiring a second portrait image based on the first mask image, wherein the second portrait image comprises a non-hair area in the portrait image; and acquiring a target image by interpolating and blending the first portrait image with the second portrait image.

13. The electronic device according to claim 12, wherein said acquiring the first mask image based on the portrait image comprises:

acquiring a second mask image based on the portrait image, wherein the second mask image represents the hair area in the portrait image;

calculating a target color value based on a color value of each pixel in the second mask image; and acquiring the first mask image by replacing the color value of each pixel in the second mask image with the target color value.

14. The electronic device according to claim 13, wherein said calculating the target color value based on the color value of each pixel in the second mask image comprises:

acquiring a convolution kernel operator, wherein the convolution kernel operator is configured to perform weighted averaging on pixel values in a particular area in the second mask image; and determining the target color value based on the color value of each pixel in the second mask image and the convolution kernel operator.

15. The electronic device according to claim 13, wherein said calculating the target color value based on the color value of each pixel in the second mask image comprises:

acquiring a third mask image, wherein the second mask image represents a hair area in a previous image of the portrait image;

acquiring an image weight value of the third mask image; and determining the target color value based on the image weight value, the color value of each pixel in the second mask image, and a color value of each pixel in the third mask image.

16. The electronic device according to claim 12, wherein the color lookup table is generated based on a standard lookup table and the target dye color by replacing a first grayscale value of a color value in the color lookup table with a second grayscale value of a color value corresponding to the target dye color, wherein the first grayscale value and the second grayscale value match each other.

17. The electronic device according to claim 12, wherein said acquiring the first portrait image based on the first mask image and the color lookup table comprises:

extracting a third portrait image from the portrait image based on the first mask image, wherein the third portrait image comprises the hair area in the portrait image; and acquiring the first portrait image by rendering the third portrait image based on the color lookup table.

18. The electronic device according to claim 12, wherein said acquiring the first portrait image based on the first mask image and the color lookup table comprises:

acquiring a fourth portrait image by rendering the portrait image based on the color lookup table; and extracting the first portrait image from the fourth portrait image based on the first mask image.

19. The electronic device according to claim 18, wherein the color lookup table comprises a plurality of key color values, and said acquiring the fourth portrait image by rendering the portrait image based on the color lookup table comprises:

acquiring a key color value corresponding to each pixel in the portrait image by searching the color lookup table; and acquiring the fourth portrait image by rendering each pixel in the portrait image based on the key color value.

20. A non-transitory storage medium storing at least one computer program comprising at least one instruction, wherein the at least one instruction, when executed by a processor of an electronic device, causes the electronic device to perform a method comprising:

acquiring a first mask image based on a portrait image, wherein the first mask image represents a hair area in the portrait image;

acquiring a first portrait image based on the first mask image and a color lookup table, wherein the color lookup table comprises a plurality of color values, colors corresponding to the color values are of the same color system as a target dye color but with different grayscale values, the first portrait image comprises the hair area with the target dye color, and the target dye color is selected by a terminal user;

acquiring a second portrait image based on the first mask image, wherein the second portrait image comprises a non-hair area in the portrait image; and acquiring a target image by interpolating and blending the first portrait image with the second portrait image.

* * * * *